(12) United States Patent
Brainard et al.

(10) Patent No.: US 9,467,293 B1
(45) Date of Patent: Oct. 11, 2016

(54) GENERATING AUTHENTICATION CODES ASSOCIATED WITH DEVICES

(75) Inventors: John G. Brainard, Sudbury, MA (US); Ari Juels, Brookline, MA (US)

(73) Assignee: EMC Corporation, Hopkinton, MA (US)

(*) Notice: Subject to any disclaimer, the term of this patent is extended or adjusted under 35 U.S.C. 154(b) by 717 days.

(21) Appl. No.: 12/975,474

(22) Filed: Dec. 22, 2010

(51) Int. Cl.
G06F 17/30 (2006.01)
H04L 9/32 (2006.01)
G06Q 20/38 (2012.01)

(52) U.S. Cl.
CPC ......... H04L 9/3234 (2013.01); G06Q 20/3823 (2013.01)

(58) Field of Classification Search
CPC .. H04L 9/3226; G06Q 20/385; G06Q 20/40; G06F 21/31
See application file for complete search history.

(56) References Cited

U.S. PATENT DOCUMENTS

| | | | | |
|---|---|---|---|---|
| 5,361,062 A | * | 11/1994 | Weiss et al. | 340/5.26 |
| 5,953,420 A | * | 9/1999 | Matyas et al. | 713/171 |
| 7,502,933 B2 | * | 3/2009 | Jakobsson | G06Q 20/341 713/172 |
| 2003/0105964 A1 | * | 6/2003 | Brainard et al. | 713/178 |
| 2004/0157585 A1 | * | 8/2004 | Sashihara | 455/411 |
| 2006/0265272 A1 | * | 11/2006 | Bosa | G06Q 10/06375 705/7.37 |
| 2008/0270791 A1 | * | 10/2008 | Nystrom et al. | 713/159 |
| 2008/0320555 A1 | * | 12/2008 | Ciaffi et al. | 726/2 |

* cited by examiner

*Primary Examiner* — Shanto M Abedin
*Assistant Examiner* — Khoi Le
(74) *Attorney, Agent, or Firm* — Krishnendu Gupta; Jason A. Reyes; John T. Hurley (57) ABSTRACT

A method and system for use in generating authentication codes associated with devices is disclosed. In at least one embodiment, the method and system may generate a secret value that depends on event state data that specifies an operating condition of a device, and may generate a series of authentication codes that depends on the secret value and a series of dynamic values.

16 Claims, 5 Drawing Sheets

|  | COLUMN 1 DEVICE SECRET | COLUMN 2 EVENT STATE DATA | COLUMN 3 ACTION | COLUMN 4 OUTPUT |
|---|---|---|---|---|
| $T_1$ | INITIAL - A1 | INITIAL - B1 | — | — |
| $T_2$ | $A_2$ | $B_2$ | TIME | — |
| $T_3$ | $A_2$ | $B_2$ | PIN ENTRY | ID AUTH CODE ($A_2$) |
| $T_4$ | $A_3$ | $A_3$ | TIME | — |
| $T_5$ | $A_3$ | $A_3$ | EVENT REGISTERED & PIN ENTRY | ID AUTH CODE ($A_3$) |
| $T_6$ | $A_5$ | $A_5$ | TIME | — |
| $T_7$ | $A_5$ | $A_5$ | PIN ENTRY | ID AUTH CODE ($A_5$) |

GENERATING AUTHENTICATION CODES ASSOCIATED WITH DEVICES

TECHNICAL FIELD

The present invention relates to generating authentication codes associated with devices.

BACKGROUND

Methods for authenticating an identity of an entity are known that are based on something the entity knows, something the entity has, a biological characteristic of the entity (sometimes referred to as something the entity is) or some combination of those things. One such computer-based authentication method involves the communication of a secret that is unique to a particular entity or user. The entity that is seeking authentication transmits the secret to a verifier who authenticates the identity of the entity. Typically, an entity communicates both identifying information (such as a user name) and a secret (such as a password) to the verifier. The verifier typically possesses records that associate a secret with each entity. If the verifier receives a secret that matches an appropriate record, the authentication of the entity is successful. If the verifier receives an incorrect secret, the authentication fails.

Time-based authentication systems also associate an entity with a secret, typically a number, which is unique to that entity. These systems generally perform some algorithmic processing of the secret to generate an authentication code that is ultimately used to authenticate the entity. Some time-based systems use a dynamic variable to calculate a non-predictable authorization code that ultimately authenticates the entity. Here, "non-predictable" means that the authorization code is not predictable by a party that does not know the associated secret, the algorithm for calculating the code, or both. The dynamic variable may comprise any code, typically a number, which is defined and determined by the interval of time in which an authentication code is generated. The dynamic variable can change according to any interval of time, e.g., 2 minutes, 5 minutes, 1 hour and the like. Because in these systems the authentication code changes from time to time, intercepted authentication information has a limited value because it cannot be used for authentication in the future.

The user may employ a device to algorithmically compute the correct authentication code for a particular time. The algorithm is typically provided to the user in the form of a hardware token loaded with a program for carrying out the predetermined algorithm, although it may be provided as software executing on a general-purpose computer. The device may also allow the user to input a second, personally selected secret, such as a personal identification number (PIN) in order to generate a correct authentication code. Only a correctly entered PIN produces a correct authentication code for a particular time. One such device is the SECURID authentication token, available from RSA Security Inc. of Bedford, Mass. These devices can display the generated authentication code to the user, who may then communicate the authentication code to the verifier.

Although the dynamic nature of the generated authentication codes in these systems avoids problems inherent with using fixed authentication codes, if such a device is left unattended it may still be vulnerable to attack. A third party attacker may enter multiple guesses for the personally selected secret values during an authentication time period. By associating each personally selected secret with the resulting authentication code generated by the device, an attacker may try to mathematically solve or otherwise determine the personally selected secret. A similar problem may occur if the user mistakenly provides one or more incorrect secret values and communicates one or more incorrect authentication codes on an insecure channel before communicating a correct authentication code generated from a correct secret value. An eavesdropping attacker can obtain information from these exchanges to try to mathematically solve for or otherwise determine the personally selected secret. Although this form of attack could be thwarted by always transmitting the authentication code on a secure channel (such as one using encryption), such channels are not available in all environments or at all times. Thus, more security features may be utilized to greater strengthen the authenticating of an identity of an entity.

SUMMARY OF THE INVENTION

A method and system for use in generating authentication codes associated with devices is disclosed. In at least one embodiment, the method and system may generate a secret value that depends on event state data that specifies an operating condition of a device, and may generate a series of authentication codes that depends on the secret value and a series of dynamic values.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in generating authentication codes associated with devices. In at least one embodiment in accordance with the current technique, a secret value is generated that depends on event state data that specifies an operating condition of a device. In this embodiment, a series of authentication codes that depends on the secret value and a series of dynamic values can then be generated. In some embodiments, this technique can be incorporated into a device, such as a telecommunications device, with a goal of helping determine the operating condition of the device with minimal processing and energy costs.

Figure 1:
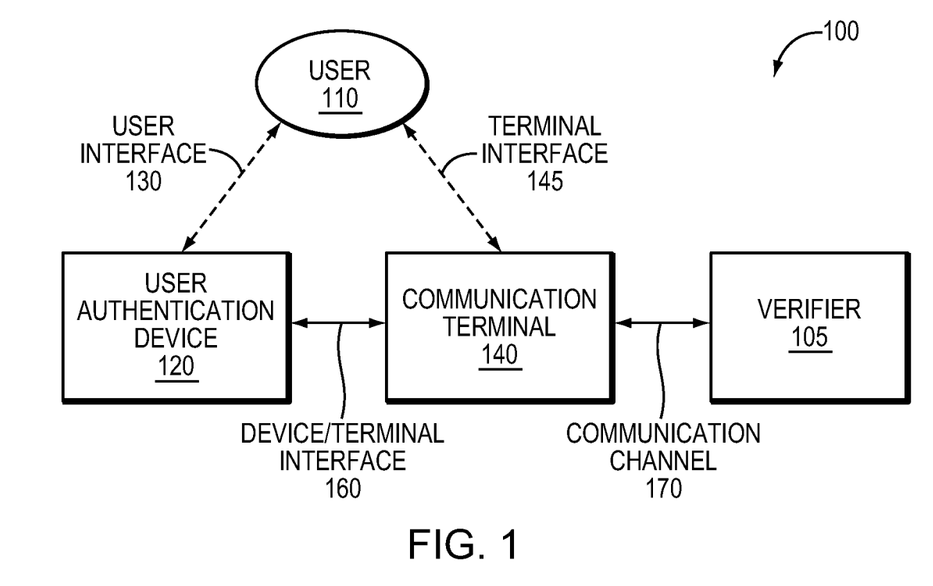
FIG. 1 is a diagram illustrating a system that may be used with an embodiment of the current technique.

Referring to FIG. 1, in one embodiment of an authentication system 100 according to the technique, a verifier 105 may be used to help securely authenticate the identity of exemplary user 110. As used here, "authenticate" means to verify the identity of a user 110, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of a single user 110 is exemplary, and typically a verifier 105 can be used to verify a large number of users 110. Similarly, the inclusion of a single verifier 105 is exemplary, and typically a user 110 can have an authentication attempt verified by one or more of a large number of verifiers 105. In some embodiments, a single verifier 105 may be able to verify a user 110, while in other embodiments, two or more verifiers 105 may perform this task.

The verifier 105 can be any sort of device that implements the functions described herein. In one embodiment, the verifier 105 may be implemented as software running on a server class computer including a processor, memory and so on, to enable authentication of a large number of users, for example, in an enterprise. The verifier 105 can also be implemented as software running on a desktop computer, laptop computer, special-purpose device or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC). In still further embodiments, the verifier 105 can be implemented in a cellular telephone, or specialized hardware embedded in a cellular telephone and adapted to interact with the cellular telephone's circuitry. Other sizes, shapes, and implementations are possible without departing from the spirit of the invention.

Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. The user 110 and the verifier 105 can be physically near one another or far apart.

As illustrated, a user 110 can communicate with a user authentication device 120. The user authentication device 120 may provide information used to authenticate the user 110. The user authentication device 120 can optionally provide a user interface 130. Communication between the user 110 and the user authentication device 120 can take place via this user interface 130. The user interface 130 may provide an input interface, an output interface, or both. An input interface may enable the user 110 to communicate information to the user authentication device 120. The input interface can be any mechanism for receiving user input, and can include, without limitation: a keypad or keyboard; one or more push buttons, switches or knobs; a touch sensitive screen; a pointing or pressing device; a trackball; a device for capturing sound, voice or handwriting; a device for capturing biometric input (such as a fingerprint, retina or voice characteristic). An output interface may enable the user authentication device 120 to communicate information to the user 110 and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface. In some embodiments, the user 110 may provide, via the user interface 130, identifying information (such as a user identifier, PIN, or password, or a biometric characteristic such as a fingerprint, retina pattern, or voice sample), or possessions (such as physical keys, digital encryption keys, digital certificates, or authentication tokens) to the user authentication device 120.

The user authentication device 120 can take various forms in various embodiments of the current technique, provided that the user authentication device 120 performs the functions required of the user authentication device 120 for secure authentication. The user authentication device 120 can be implemented in packages having a wide variety of shapes and form factors. For example, in some embodiments the user authentication device 120 can be, or be incorporated within, a telecommunications device such as a cellular telephone, or a cellular telephone with specialized embedded hardware adapted to interact with the cellular telephone's circuitry, such as a SIM card. In this example and in others, the authentication device 120 can be two components in communication with each other, for example a wireless telecommunications device and a removable accessory, such as a SIM card. In other embodiments, the user authentication device 120 can be a credit-card sized and shaped device, or can be much smaller or much larger. One credit-card sized embodiment of the user authentication device 120 includes a microprocessor with on-board memory, a power source, and a small LCD display. Embodiments may optionally include a keypad or buttons for PIN entry, entry of authentication information requests, or for other entry or interaction with the device 120. In another embodiment, a credit-card sized device 120 may include a processor with on-board memory that may be used as a "smart card," that can be installed into another device that provides power and/or an interface. In still other embodiments, a credit-card sized device 120 may be a card such as a credit card including a magnetic strip or other data store on one of its sides. In other embodiments, the user authentication device 120 may be a "key fob," that is, a smaller device with a display and battery that may be sized and shaped to fit on a key ring. In yet another embodiment, the user authentication device 120 may be a device or peripheral device combined with, and able to communicate with, a computer, telephone, or other device, such as a USB dongle or a Global Positioning System ("GPS") receiver. In still other embodiments, the user authentication device 120 can be a desktop computer, laptop computer, or personal digital assistant (PDA). For example, the authentication device 120 can be implemented as a general-purpose computer running a software program that possibly interacts with one or more other computer programs or devices on the same or a different computer or device. For example, the authentication device 120 may include a web-browser with a plug-in software component. Other sizes, shapes, and implementations are possible without departing from the spirit of the invention.

Exemplary authentication devices with which the embodiments of the current technique can be used are members of the RSA SECURID family of authentication tokens, available from RSA Security Inc. of Bedford, Mass. Some RSA SECURID hardware devices, for example, display a generated authentication code value to a user, who then communicates the displayed authentication code value to a computer for communication to a verifier. For example, in one embodiment, the information may be a numerical value.

In some embodiments, the user authentication device 120 stores a seed or secret that may be used to help authenticate the user 110. Typically, the seed may be information that only is available to the authentication device 120 and the verifier 105. For example, in one embodiment, the information may be a numerical value. The seed can be used to help generate an authentication code for the user 110. The user authentication device 120 can also store or access dynamic data, which, for example, can be the current time, if implemented with a running clock. The user authentication device 120 can also provide other information, or perform other calculations or combination functions, as described further below. For example, in one embodiment, in addition to a seed, the device 120 may receive a personally selected secret from the user 110 (such as a PIN or password) and generate a dynamic, non-predictable authentication code value in response to the secret received from the user 110, the seed, and the current time. Here, for example, a non-predictable authentication code value may be unpredictable to anyone who does not have access to the secret received from the user 110, the stored secret, and the algorithm that generates the authentication code value. The user authentication device 120 optionally can also receive other input, such as verifier identification, and use that and/or other additional information in the generation of the authentication code value.

User 110 optionally (and depending on implementation) has one or both of direct access to the communications terminal 140 and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a network interface card; a wireless transceiver. During the authentication process the user 110 can directly communicate information to only the device 120, only the terminal 140, neither the device 120 nor the terminal 140, or both the device 120 and the terminal 140. Likewise, the communications terminal 140 can receive direct input from the user 110, the user authentication device 120, or both. As shown, the user 110 optionally communicates directly with the communications terminal via the terminal user interface 145 that can be present depending on the implementation of the communications terminal 140. Like the device user interface 130, the terminal user interface 145 can include an input interface, an output interface, or both. The input and the output interfaces can take one or more of the forms described above for the device user interface 130, or other forms.

The communications terminal 130 can optionally provide a device/terminal interface 160 for communications between the terminal 140 and the user authentication device 120. In one embodiment, this interface could take the form of a wired or wireless communications channel between the terminal 140 and the device 120, using standard or proprietary protocols. For example, in an embodiment in which the device 120 is a smart card and the terminal 140 includes a card reader, the communications interface 160 could be a wired serial communications link between the smart card and the reader. In another embodiment in which the device 120 is a telecommunications device and the terminal 140 includes a wireless transceiver, the interface 160 could be a wireless link.

The communications terminal 140 can provide a user interface 130, via a terminal interface 145, without providing a device interface 160 for the device 120. For example, the terminal 140 can be a telephone that the user 110 uses to communicate authentication information to the verifier 105. In such an embodiment the user authentication information can be represented as tones associated with a series of alphanumeric digits. In this embodiment the user 110 may dial a telephone number to establish a communications connection with the verifier 105 and performs a series of key presses on the telephone to communicate the alphanumeric user authentication information to the verifier 105.

The terminal 140 and the authentication device 120 can each be integrated, together or separately, into another device, likewise, the functionality of the terminal 140, the device 120, and their respective interfaces 130, 145, 160 can be implemented in separable components. For example, the authentication device 120 can be implemented as an add-in card to a handheld computer (not shown) or as a plug-in software component. A handheld computer may provide the user interface 130 and also provides the terminal 140 in the form of a wireless network interface. Likewise, a mobile telephone can provide terminal 140 and user interface 130 functions, while the mobile telephone, or a plug-in component such as a SIM card, provides some or all the authentication device 120 function.

The communications terminal 140 may communicate information to the verifier 105 via a communications channel 170. The communications channel 170 can be any method and/or interface that enables communication of information to the verifier 105 that may be required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 may process the information received from the communications terminal 140. The verifier 105 can perform actions in response to authenticating the identity of the user 110. For example, the verifier 105 can grant on-line access to data or physical access to restricted areas or physical items.

The authentication code values communicated over the communications channel 170 can be implemented to be dynamic and unpredictable (to an observer without knowledge of the algorithm and/or values used to generate the authentication code values and/or access to previous user authentication attempts) for each user authentication attempt. In some embodiments, the algorithm is selected such that the authentication code is non-predictable even if the algorithm is known to the attacker. Also, the algorithm may be selected such that knowledge of a large set of previous authentication attempts for a multiplicity of users would not make an authentication code predictable to an attacker. The authentication code can also communicate event state information, as described further below.

For each user authentication attempt, the verifier 105 receives user authentication information and verifies the received information. As described further below, in some embodiments, the verifier 105 also determines an event state indicating whether one or more events have occurred, and optionally, in some cases, the nature of an event. In some embodiments, in order to authenticate the user, the verifier 105 performs algorithmic calculations for each user authentication attempt that is substantially identical to the algorithmic calculation performed by the user authentication device 120. In some embodiments, the verifier 105 can determine authentication codes for a number of possible events and event states such that a number of authentication codes that can successfully authenticate the user 110 are possible. The verifier 105 compares the authentication information received over communications channel 170 and the authentication information generated by the verifier 105 to determine whether any match. If there is a match, then the verifier 105 can authenticate the identity of the user 110 depending on the event state determined. In one embodiment, when the received and generated user information do not match, the user authentication attempt fails. In some embodiments, the verifier 105 can communicate positive or negative acknowledgement to the communications terminal 140 via the communications channel 170, and the terminal 140 may or may not communicate the acknowledgement to the device 120 or directly to the user 110. In further embodiments, where a plurality of authentication codes that can successfully verify the user 110 are possible, the verifier 105 first determines an expected authentication code for an expected event state, and if the verifier 105 receives a different authentication code, determines and compares authentication codes for other possible event states before indicating whether the authentication device has been successfully verified. Note that there can be other possible authentication codes as well, for example due to a generation value increment (described further below) and imprecisely synchronized time clocks between the verifier 105 and the authentication device 120.

In one embodiment, a determination by a verifier 105 of an event occurrence triggers a restriction on the activities of a user 110, rather than a complete denial of access. The restriction can be based on the type of events that have occurred since the preceding authentication attempt. For example, a workstation user's access to highly confidential information can be eliminated while access to non-confidential information continues to be permitted when the user's PIN was entered into the authentication token incorrectly more than a specified number of times.

The user authentication device 120 can maintain event state data which indicates whether an event has occurred. The reportable event(s) about which the event state is maintained may be unusual events that do not occur during normal operation of the device. Examples of such anomalous events include tampering with the device, an environmental event (e.g. aberrant temperature), incorrect power supply, or radiation detection. Other examples of reportable events can include, without limitation, device location (e.g., is the device in a specific building, room, city, country, region, or some combination); the length of time a device (e.g., if a card, token, etc.) is inserted in a reader (possibly indicating that a user left an unattended device in the reader); authentication quality (e.g., a number of PIN errors prior to successful authentication, strength of a biometric match, etc.); device signature or pattern (e.g., the device generates a pattern or sequence of bits that can be checked by the verifier, and the event state indicates the current bit in this pattern); related authentication (e.g., the verifier can determine whether access to network resources is being requested from a physical location that the requestor entered in an authorized manner); and location of the seed (e.g., event state indicates whether a seed is in an approved hardware device (e.g., a card, token, etc.) or has been transferred (e.g., downloaded to a software container such as a laptop)). Some reportable event states may be unique to a particular type of authentication device 120. For instance, in an embodiment where authentication device 120 is a telecommunications device, the use of an unauthorized SIM card or connecting an unauthorized device to the telecommunications device may be reportable event states. The size of the event state data can depend on the number of possible event states. For example, for four event states, only two bits are needed (i.e., the values 00, 01, 10, and 11 each represent event states). For seven states, three bits, and so on. Thus, taking geographic location as an example, three bits can be used to indicate one of seven possible locations, or a much larger number of bits can be used to indicate longitude/latitude.

An event occurrence may result in a change in the event state kept by the user authentication device 120, with the further result that the authentication code generated by the user authentication device 120, with high probability, may be different than otherwise expected by the verifier 105. The verifier 105 can determine whether a received identity authentication code is associated with one or more events, and if it is, take appropriate action, such as warning an administrator or restricted access.

The event state need not have a specific meaning to the verifier 105. For efficiency, the verifier can determine which event state(s) are most likely and initially check authentications with the authentication codes associated with the most likely event state(s). The verifier can verify authentication codes with the most likely event state information to determine whether the event state that is being signaled is either valid (e.g., expected) or invalid (e.g., unexpected). Additionally, the interpretation of the event state can be accomplished outside of the verification process. In one embodiment, the event state information is analyzed and interpreted by an entity who is not a verifier in order to determine what event the event state is signaling, e.g., tampering or low battery. The verifier can communicate the event state information to a service that can interpret the event state.

When the verifier checks authentication codes for their correspondence with likely individual event states, the efficiency of the verifier's operation may depend on the number of likely event states. For example, if there are only two likely event states, then the verifier may only perform, at most, two checking operations, whereas if there are ten likely event states, the verifier may perform as many as ten checking operations. The verifier may be able to accommodate a significant number of event states in this manner. However, in some embodiments, the verifier can accommodate an increased number of event states because the authentication code may provide a hint to the verifier about the event state. In other embodiments, the event state may be provided in a way that can otherwise be recovered from the authentication code without checking all likely individual event states. In such embodiments, the efficiency of the verifier's operation may not depend on the number of such event states.

Since each likely event state may correspond to a different authentication code, the probability that a random authentication code is accepted by the verifier may increase as the number of likely event states increases, particularly if the length of the authentication code is fixed. Accordingly, it may be prudent to increase the length of an authentication code as the number of likely event states increases in order to keep the probability that a random authentication code is accepted sufficiently small. For example, if there are ten likely event states, then the length of the authentication code may be increased by one numeric digit.

As a simple example, in one embodiment, the user authentication device 120 can maintain a temporary event state data store. In this example, prior to the occurrence of an event, the event state data store may equal zero. In some embodiments, as explained further below, the contents of the event data store may be utilized, at a predetermined time, to help generate an authentication code produced by the device 120 that is communicated to the verifier 105. Upon the occurrence of a specific event, the event state data store can be modified to be, for example, one hundred. In an example embodiment, the authentication device 120 may include a switch activated by the opening of the case of the authentication device 120, such that if the device 120 is opened, the switch causes an interrupt, which causes the processor in the authentication device 120 to change the contents of the event data store to one hundred. Initially, the event state data may not be used to help generate an authentication code. Rather, at a predetermined time, the contents of the event data store can be used in such a way as to help generate an authentication code that differs from the expected authentication code by exactly one hundred. When the verifier 105 receives the authentication code it can immediately recognize that a received authentication code (i.e., the second authentication code) is not the initially expected authentication code. The verifier may also recognize that the received authentication code is different than expected by a value of one hundred. The verifier can then conclude that the event that triggers the change in event state data (in this case, opening of the authentication device) has occurred. In further embodiments, different events may change the authentication code differently (e.g., add one, ten, etc.). In yet further embodiments, multiple events may occur before an authentication code is generated using the event state data and may change the authentication code differently. In these embodiments, different events may be recognized depending on the resulting authentication code. As described further below, certain techniques can make it easier for the verifier to determine if an event occurred, while being much harder for an attacker to determine that an event occurrence was detected. The switch can be any means that provides a state change if the authentication device 120 is opened or otherwise tampered with including, without limitation, a separable contact surface, or any form of limit switch such as a pushbutton switch, rocker switch and the like.

In at least one embodiment, in order to authenticate the user 110 and determine the event state of the authentication device 120, the verifier 105 performs an algorithmic calculation on a received authentication code that "reverses" some or all of an algorithmic calculation performed by the user authentication device 120. In a simplistic example, the user authentication device 120 generates an authentication code by arithmetically combining a secret stored by the user authentication device 120 and a user-supplied PIN. In order to verify the user in this example, the verifier may retrieve from its records the PIN associated with the user and the secret stored on the user's authentication device 120. The verifier 105 reverses the combination operation, e.g., by subtracting and/or XOR the user's PIN from the received authentication code. The verifier 105 can compare the result after PIN removal to the value of the secret stored on the user's authentication device 120, or to the value that should have been generated at that time by the device 120 using the stored secret. If they match, the user may be authenticated. If they do not match, user authentication may fail. In some embodiments the verifier 105 decrypts a value encrypted by the user authentication device 120 using symmetric key encryption or asymmetric encryption techniques, such as public key encryption. In some embodiments, the verifier 105 also calculates the authentication code with data that indicates whether one or more events have occurred. In other versions, the verifier 105 calculates the authentication code with data that indicates whether an event has occurred, and also indicates additional information concerning the event.

In other embodiments, a first authentication of user 110 can be performed by the user authentication device 120 based on information supplied to the authentication device 120 by the user 110. For example, the information supplied by the user may be a PIN, a password or biometric information. The device 120 may perform this first authentication alone or in combination with another device. If the first authentication is successfully verified by the authentication device 120, the device 120 can generate an identity authentication code which is verified by the verifier 105. In a further embodiment, the first authentication can be a local authentication performed in the presence of the user 110.

Figure 2:
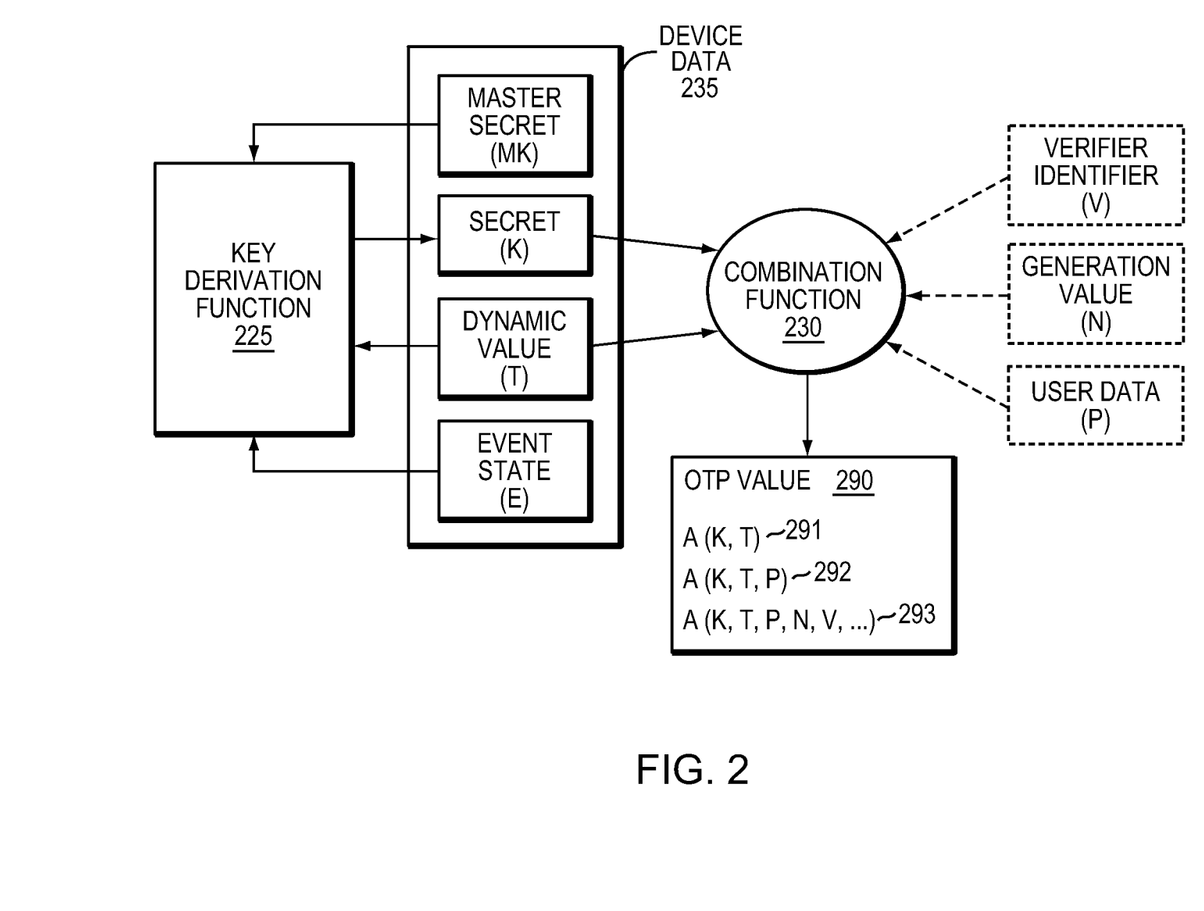
FIG. 2 is a diagram illustrating values and components that may be used with an embodiment of the current technique.

FIG. 2 depicts one embodiment of the user authentication device 120 and verification computer 140 of FIG. 1 in which various values are inputted and combined by a combination function 230 to generate an authentication code 290. It should be understood that the manner of combination and the input provided to the combination function 230 could vary from these examples. In one embodiment, an authentication code 290 may be constructed from device data 235, which may include a secret (K) and a dynamic, time-varying value (T) generated by the user authentication device 120.

Other example inputs that may be used include the time and date of manufacture of the user authentication device 120, the amount of time since generation of the last authentication code, an encoding of the latitude and longitude of the location of manufacture of the user authentication device 120, an encoding of the location of the user authentication device 120 at the time of generation of the user authentication device (using GPS or enhanced GPS, for example), or other similar quantities. The combination function 130 may also optionally use one or more of user data (shown in phantom view as user data (P)) or verifier data (shown in phantom view as verifier identifier (V)) and a generation value (shown in phantom view as generation value (N)) to generate an authentication code (A) 290 for the user. Examples of user data include data derived from biometric information such as retinal scans and fingerprints; identifying information such as social security number, birth data (possibly including time of birth); and unique names and numbers, or other information. Verifier data can include information identifying the verifier 105, such as a name, number, IP address, or processor serial number. A generation value N can indicate the number of authentication codes requested in a specified time period.

The combination function 230 may be implemented as instructions executed by a computer, for example, by firmware instructions executed by an embedded microprocessor. In other embodiments, the combination function 230 may be implemented in special-purpose hardware, such as an application specific integrated circuit, a field-programmable gate array, or other programmable logic device. In still other embodiments, the combination function 230 may be implemented as a software application program running on a general-purpose desktop, laptop, or handheld computing device.

FIG. 2 depicts a number of embodiments for generating authentication code 290. In one embodiment, authentication code 291 is constructed from a stored secret (K) and a dynamic value (T). In this embodiment, the authentication code (A) 291 is represented as a function of elements K and T, which is written A (K, T).

The combination function 230, and the elements of the combination function may be implemented in the device 120, the communications terminal 140, or some combination of the two.

The stored secret (K) can be a unit of information such as a numerical value that may be, in some embodiments, based on a value that is manufactured into and stored inside the device 120 such that it can be very difficult to extract from the device. In a typical software implementation of the device 120, the secret (K) may be stored in a data store, preferably secure, and accessible to the device 120. In addition to being accessible to the device 120, the secret (K) may also be stored in a secure data store accessible to the verifier 105. In some embodiments, only the device 120 has access to the secret (K), and the verifier has access to a function of the secret (K), or vice-versa. In some embodiments the device's 120 secret (K) corresponds to, but may not be the same as a value stored with the verifier 105, for example, where each has one of a pair of keys in a public key cryptosystem. In other embodiments the secret (K) can be derived from a master secret (MK), as described below, which may be the value that is manufactured and stored inside the device 120. In some embodiments, the secret (K) can be a value that is chosen from a large number of possible values such that it would be difficult for an attacker who had access to the output of the combination function 230 to guess the secret by trying each possible secret value to see if it resulted in the observed authentication code value. In one particular embodiment, the secret (K) may be selected from the group of numbers that are 128 bits in length.

The dynamic value (T) may be a unit of information such as a hexadecimal or decimal numerical value that changes over time. In one embodiment, the dynamic value (T) is uniquely associated with a particular pre-determined time interval demarcated by a particular starting time and ending time. The time interval may not be required to be of any particular length nor may every time interval be required to be the same length. The only requirement is that the time interval schedule be roughly synchronized between device 120 and verification computer 150. Methods that may be used to synchronize device 120 and verification computer 150 are described in U.S. Pat. No. 4,885,778, titled "Method and Apparatus for Synchronizing Generation of Separate, Free Running, Time Dependent Equipment." A time interval could have the length of a minute, an hour, a month, a year or any other convenient length of time. The dynamic value (T), identifying a particular time interval, remains constant for all authentication codes generated within that particular time interval.

For example, in one embodiment, a constant time interval of a minute can be used, and the dynamic value is the number of minutes since Midnight, Jan. 1, 1980. In another embodiment, a time interval of an hour can be used and the dynamic value may be the number of seconds since Noon, Dec. 15, 1999. The number of seconds can be determined for the first second of each time interval. In such an embodiment, the time from which counting begins may be a secret that is shared between the device 120 and verification computer 150. The interval period length(s) may also be secrets that are shared between the device 120 and the verification computer 150.

In another embodiment, the length of each time interval may be an hour. Since, there are 24 hours in a day, each hour can be identified by a unique value such as the values 1 through 24; each of the 365 days of the year can be uniquely identified by the values 1 through 365; and each year can be identified by the number of the year, for example 2001. These three values, each identifying an hour, a day or a year, are combined in such a manner to produce a value that uniquely identifies one and only one particular one-hour time interval. This one hour time interval can be indicated by a particular (hour-day-year) combination. For example, the value 100232001 would uniquely identify the period of time between 9:00 am and 10:00 am on the 23rd day (023) of the year 2001 (2001), that is Jan. 23, 2001. Similarly, the value 170322001 would uniquely identify the time period between 4:00 pm and 5:00 pm on the 32nd day (032) of the year 2001 (2001), that is Feb. 1, 2001. Other variations will be immediately understood by those of ordinary skill in the art.

In one embodiment, the dynamic value (T) is provided as the output of a time clock function. The time clock function may provide the current time to the dynamic value function. The dynamic value function determines the appropriate dynamic value (T) in response to the data provided by the clock function. In one such embodiment, implemented in a device having a clock and a processor, the dynamic value (T) is generated by a clock that is a counter that is set to an initial value and is incremented every second. This clock counts the number of seconds since the initially configured time. Every sixty seconds the clock signals the dynamic value function, which reads the clock, increments the dynamic value (T), and stores the incremented dynamic value as the dynamic value (T) for that time interval. In some embodiments the time value is provided in ISO-8601 format.

In one embodiment, the secret (K) and the dynamic value (T) are provided to the combination function 230 for combination as authentication code A (K, T) 291. The combination of the secret (K) and the dynamic value (T) can take place in any order and may use one or more various combination methods. For example, in at least one embodiment, a one-way function such as a hash function, can be applied to one or more of the values (K, T), and the result truncated to the right length, in order to arrive at a resulting authentication code. A one-way function is any mathematical function that maps a universe of input values to a universe of output values in such a way that knowledge of the output of the function does not allow one to reconstruct the input provided. An example of a one-way function is a hash function, such as MD4, MD5, or SHA-1. In one particular embodiment, a block cipher, such as RC6 or Rijndael, use the secret (K) as the key and the dynamic value (T) as the data in order to generate the combination of (K) and (T).

User data (P) can also be provided as input to the combination function 230. In at least one embodiment, the user data (P) can be a unit of information such as an alphanumeric character string, or a strictly numerical value, for example a personal identification number (PIN) or password. In one embodiment, the user data (P) can be information uniquely associated with the user 110. The user data (P) can also be obtained by biometric measurement or observation. In one embodiment, the identity or value of the user data may be a secret known only to the user 110 and the verifier 105 (i.e., not to the device). The user data (P) can be stored in a manner accessible to the verifier 105 that protects it from being compromised. The user data (P) can be, for example, the actual PIN, password, or biometric data that is provided by the user, or the user data value (P) can be the result of processing of the user data by one or more other functions. For example, the user data (P) can be mapped to another value with a one-way function, such as a hash function, or a key derivation function (such as key derivation function 225) before being provided as an input to the combination function 230. Derivation functions can be used that combine the password with other information. For example, to increase security a random string of information referred to as a salt can be combined with the password prior to the application of a derivation function. The salt need not be a secret value. An iterative function can also be included in a derivation function. A number, referred to as an iteration count, can be used to indicate how many times to perform an underlying function by which the password is derived. The incorporation of the iteration count into a derivation function increases the effort required to derive a password. A modest number of iterations, for example 1000, is not likely to be a burden for legitimate parties when computing a key (e.g., user data), but it may be a significant burden for attackers. If the user data value is random and selected from a large number of possible values, a smaller iteration count can be used.

In one embodiment, the combination function 230 combines the user data value (P) with the secret (K) and the dynamic value (T) to generate an authentication code A (K, T, P) 292. The combination function 230 can combine these values (K, T, P) in any order (and with other values not mentioned) to generate the authentication code 292. In one particular embodiment, the user authentication device 120 may first combine (K, T) to generate an authentication code A (K, T) 291 as described above. The combination function 230 may then combine the generated authentication code 291 with the PIN (P) to generate an authentication code 292 that is a function of (K, T, P). The PIN (P) can be combined with A (K, T) by prepending or appending the PIN (P) to A (K, T), by arithmetically adding the PIN (P) to A (K, T), or using a block cipher or other one-way function, or other algorithm, or a combination of these and other techniques that combine two or more input values together. The same steps can be used for both combinations, or they can be different—for example, (K) can be provided as key input to a block cipher and (T) as data inputs to the block cipher, and the PIN combined with the block cipher result by an addition or exclusive-or operation. In another embodiment, the user data value (P) and the event state (T) are combined first for use as input to an encryption function, and then the secret (K) are combined with them by using them as a key to encrypt the result. In another embodiment, the dynamic value (T) and the secret (K) are combined, and the user data value (P) are combined with the result. The combination can take place at the same time, for example, as the values are provided as input to a single function, or in stages, as some values are combined with others. Certain combinations can take place on the user authentication device 120 while others can take place on the communication terminal 140. Of course, it should be understood that the combination can include as variations other values or processing.

As described, various embodiments of the device 120 can receive input of the user data (P) in various ways. These can include without limitation, user input (e.g., of a PIN) via a keypad, a keyboard, a touch sensitive screen, selection with a pointer or mouse, handwriting recognition, voice recognition and so on. The user data can be read using a biometric reader that is integrated with the authentication device 120. The user data (P) can also be communicated from another device via electrical or electromagnetic means. It should be understood that there can be more than one item of user data (P), for example, provided by PIN entry and a fingerprint reader. Likewise, as another example, a PIN can be verified by the device, and data provided to the combination function in response to successful verification of the PIN by the device.

In various other embodiments, other data can be combined with the data just described (i.e., with or without the user data (P)) to generate the authentication code 293. This other data can include a generation value (N), which is incremented for each authentication code requested within a time interval. See co-pending U.S. patent application Ser. No. 10/010,769, entitled "Enhanced Time-Based Authentication," by Brainard et al., the contents of which are hereby incorporated herein by reference.

The other data can include a verifier identifier (V), which may be a value associated with the identity of a particular verifier (105) or group of verifiers. The use of the verifier identifier (V) may allow the same user authentication device 120 (with the same secret (K) to be used with verifiers operated by different entities without giving a particular entity information that could be used to impersonate the user to another entity. See co-pending U.S. patent application Ser. No. 09/304,775, entitled "System and Method for Authentication Seed Distribution," by Brainard et al., the contents of which are hereby incorporated herein by reference.

For example, in one embodiment, the combination function 230 combines a secret (K), a dynamic value (T), user data (P), verifier identifier (V), and a generation value (N) to generate an authentication code 293. The combination function can combine these values (K, T, P, V, N) in various ways and in any order. Before being combined by the combination function 230, these values can be processed by one or more other functions. Various embodiments of the authentication device 120 can receive input of this data in various ways.

In some embodiments, a master key (MK) is inputted into a key derivation function 225 to help derive secret (K). In one embodiment, the secret (K) can change over time by using the key derivation function 225. As a simple example, the key derivation function 225 can use the master key (MK) to determine a portion of master key (MK) to be used as secret (K). In this example, portions of the master secret (MK) may be derived from other portions based on the dynamic variable (T) and used as secret (K). For instance, there can be a portion of the master secret value (MK) that is allocated for a particular time interval. In this embodiment, a portion of the master secret (MK) can be used to derive secret (K) values that are different for each second, each minute, each hour, each day, each month, or each year. This can be accomplished by using the master secret (MK) to derive a set of secret (K) values: one corresponding to the current year ($K_Y$), one corresponding to the current month ($K_M$), one corresponding to the current day ($K_D$), one corresponding to the current hour ($K_H$), and one corresponding to the current minute ($K_{MIN}$), that is, K=($K_Y$, $K_M$, $K_D$, $K_H$, $K_{MIN}$) (or a subset or a function based on one or more of them), for each minute time value according to dynamic value (T). Thus, in these embodiments, portions of the master secret (MK) can be derived from each other, and a portion of the master secret (MK) can be used as secret (K) to generate the authentication code 290.

For example, the yearly secret ($K_Y$) can be generated by incorporating a block cipher within the key derivation function 225, and using the block cipher with a master secret as the key and the current year, appropriately padded, as the data value. For example, the current year value (0000-9999) can be padded with 0's, 1's, or some random pattern that is known to the verifier 105, in order to provide a 128 bit data block. Thus, $K_Y = E_{MK}$ (YYYYPPPPPPPPPPPP) where P represents padding and $E_{MK}$ represents a block cipher of the data YYYY using the master secret as the key. In a similar manner, a monthly secret can be derived by applying the same or a different block cipher a second time: $K_M = E_{KY}$ (YYYYMMPPPPPPPPPP) where YYYYMM represents the current month and year values and the yearly secret is used as the key to the block cipher. Daily and hourly secrets can similarly be generated: $K_D=E_{KM}$(YYYYMMDDPPPPPP) and $K_H=E_{KD}$ (YYYYMMDDHHPPPP).

In various embodiments, each of the set of secrets can be used during a relevant time interval to help generate authentication codes. For example, the hourly secret can be used as the secret above, combined with the time, to generate an authentication code. Although the above example has been given with respect to block ciphers, it will be understood that any of the methods described here for generating the secrets can be used (e.g. hash functions). Other techniques for generating new secret values are described in U.S. Pat. No. 5,361,062 to Weiss, entitled, "Personal Security System," which is hereby incorporated by reference herein.

Figure 3:
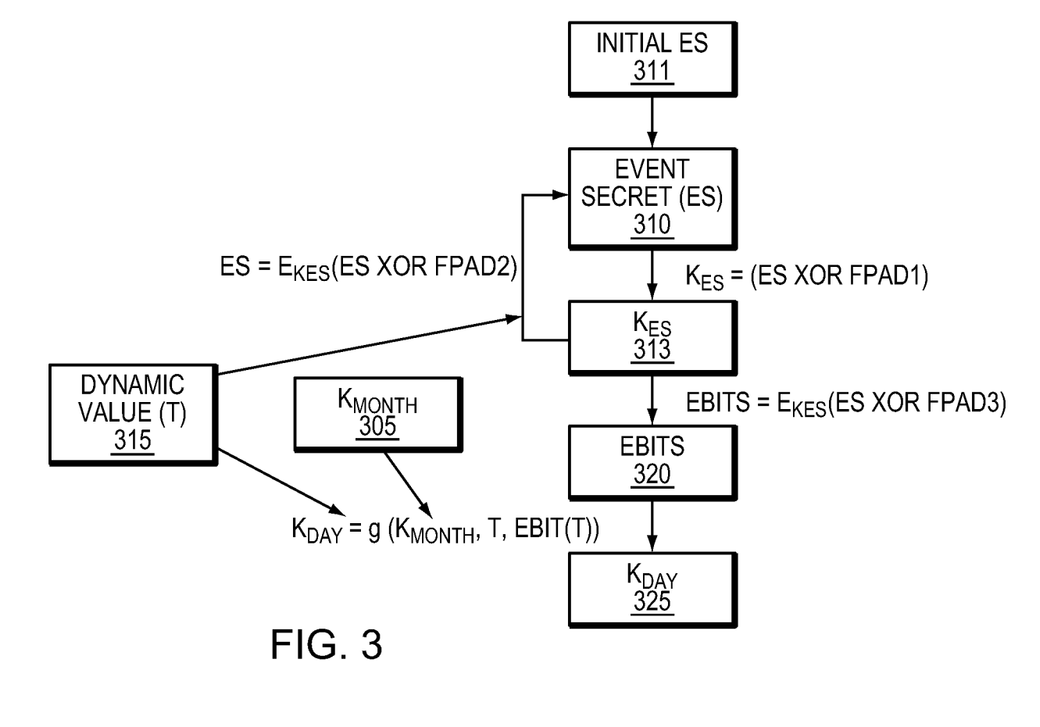
FIG. 3 is a diagram illustrating a sequence that may be used with an embodiment of the current technique.

Referring to FIG. 3, an embodiment of a method for deriving authentication codes that communicate event state data is shown in which an event secret (ES) value 310 is repeatedly updated and used, for example, at the time that a new secret (K) is to be derived by the key derivation function 225, e.g., each hour if an hourly secret ($K_H$) is being used to generate authentication codes or each day if a daily secret ($K_D$) is being used to generate authentication codes. For instance, in an example embodiment where a daily secret ($K_D$) is used to help generate a new authentication code for every minute, the event secret (ES) value 310 may be updated and used in conjunction with the master secret (MK) by the key derivation function 225 to derive a new daily secret ($K_D$) when the time comes to derive a new daily secret ($K_D$), e.g., the next day.

In one embodiment, repeated updates of the event secret (ES) value 310 prevents an attacker with access to event state data from determining whether an event has been detected, because the attacker cannot determine whether the changes to the event state data are the result of event detection or a routine update. Thus, event detection remains covert. In some embodiments, repeated updates of the event secret (ES) upon derivation of new secrets may also use less processing power than, for example, updating the event secret (ES) based on the dynamic value (T). For instance, verifier 105 and authentication device 120 need only calculate a new event secret (ES) value when a new secret (K) is derived and not during each generation of an authentication code. As a result, energy resources used to derive and validate authentication codes can be utilized more efficiently and can be better conserved.

In some embodiments, upon the occurrence of a reportable event, the device takes an action to modify the event secret (ES) 310 in some way during the next event secret (ES) 310 update, i.e., when a new secret (K) is derived. The event secret (ES) 310 may be modified, e.g., by the same function that is used to update the event secret (ES) 310, by a different function, or by combining the event secret (ES) 310 with other data. The event secret (ES) may then be used to help derive a new secret (K). Thus, authentication codes generated after the new secret (K) is derived can convey the new event state (ES) 310 of the device.

As mentioned above, the authentication device can have a master key (MK) which is used in combination with the dynamic value (T) 315 to generate a secret associated with, for example, a day ($K_D$) 305. The day secret ($K_D$) can be generated by encrypting information concerning the current date using the month encryption key $K_M$ and optionally the event secret (ES) 410, which in this embodiment has an initial value 311.

When a new secret (K) is to be derived, which may be determined by the dynamic value (T) 315, a new value of the event secret (ES) 310 can also be derived using an event secret key ($K_{ES}$) 313, e.g., upon the first derivation, the initial value 311 is replaced. Changes to the value of the event secret key ($K_{ES}$) 313 also result in changes to event state bits (EBITS) 320 which are derived from the event secret (ES) 310 using the event secret key ($K_{ES}$) 313. The event state bit or bits (EBITS) 320 may then be used to help derive a secret (K), which is used to help generate an identity authentication code.

In this embodiment, the event secret key ($K_{ES}$) 313 is derived according to the equation $K_{ES}$=(ES xor FPAD1), where FPAD1 is a predetermined constant value. At each update interval (i.e., when secret (K) changes as determined by dynamic value (T) 315), the new value of the event secret (ES) 310 can be derived by using the event secret key ($K_{ES}$) 313 to encrypt the results of a logical operation applied to the existing value of the event secret (ES) 310, for example, according to the equation ES=$E_{KES}$ (ES xor FPAD2), where FPAD2 is also a predetermined constant value. Event state bits (EBITS) 320 may also be derived by encrypting the results of a logical operation applied to the event secret (ES) 310, for example, according to the equation EBITS=$E_{KES}$ (ES xor FPAD3), where FPAD3 is another predetermined constant value. Thus, to form the event state bits (EBITS) 320, an exclusive-or operation is applied to the event secret (ES) 310 and the FPAD3 constant value.

In some embodiments, the derivation of an authentication code using a secret (K) that incorporates the event state bits (EBITS) 320 may be completed by deriving additional secrets. For example, in the case where a secret for the day ($K_D$) is being used to generate authentication codes each minute, a secret for the month ($K_M$) may first be derived by the key derivation function 225 from the yearly secret ($K_Y$), the dynamic value (T) 315, and the event state bit associated with that month (EBITS(T)). A secret for the day $K_D$ can then similarly be determined by the key derivation function 225 from the secret for the month ($K_M$), the dynamic value for the day (T), and the event state bit associated with that day (EBITS(T)). The daily secret $K_D$ may then be input into combination function 230 to generate authentication codes for each minute associated with the day. In some embodiments, the authentication code can be further derived by, for example, combining a PIN and/or other values as described.

Figure 4:
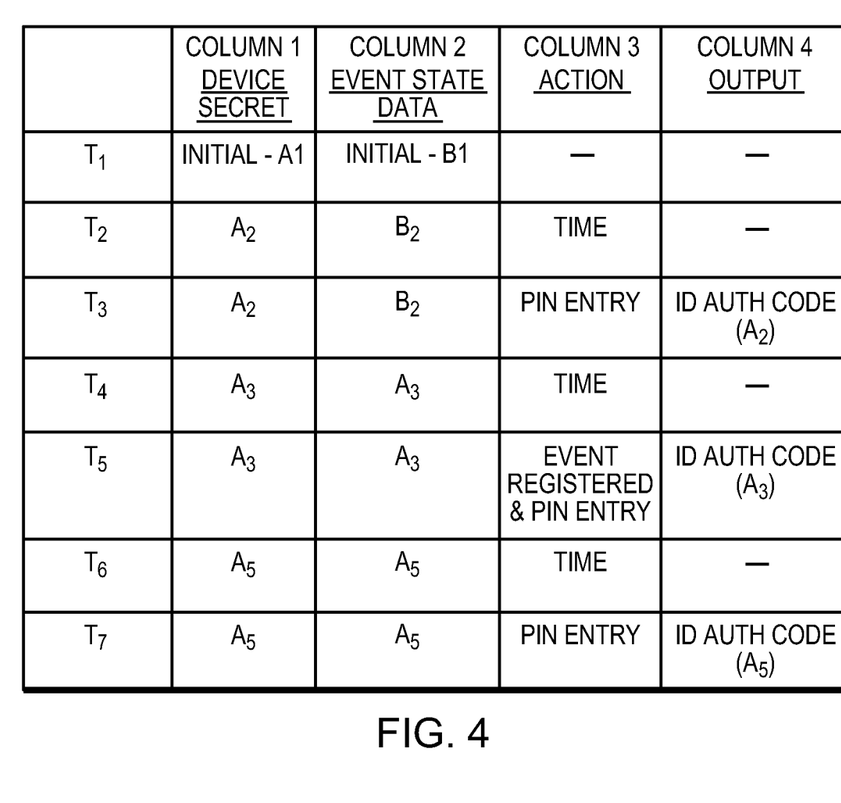
FIG. 4 is an example table demonstrating the use of an embodiment of the current technique.

Referring to FIG. 4 the contents of two value storage portions of device memory are shown in column 1 and column 2. Here, values in column 1 represents secret values associated with the authentication device, and values in column 2 represent event state data values associated with an event state. Actions, as shown in column 3, can affect the example output (column 4) and/or the stored values (column 1, column 2). The leftmost column represents time increments beginning with initial time $T_1$ and ending at time $T_7$. Because events may not occur on a periodic basis, it should be noted that the length of time, between two adjacent times (e.g., $T_1$ and $T_2$) may not equal the length of time represented by another pair of adjacent times (e.g., $T_2$ and $T_3$). In this example, the output is displayed on a screen, however, as previously mentioned, other means of output are possible. In one embodiment, the secret value (column 1) that is updated is a value other than the master secret value.

At a first time period $T_1$, the authentication device may be initialized. This can be performed either during the manufacturing process, or in a later setup process. Initialization can be accomplished either remotely or locally, for example, by wirelessly transmitting the device secret to the mobile device or downloading the secret to a device that is connected to a network. The initialization process can be performed such there is at least partial synchronization between the device and at least one verifier. Here, synchronize is used to mean that two or more devices (i.e., the authentication device and the verifier) obtain consistent representations of some information. This can include the verifier sharing the complete representation of data $A_1$ stored as the device secret (column 1) and the complete representation of data $B_1$ stored as the event state data (column 2). It can also include, for example, sharing a portion of the data, or a representation in the sense of a public key related to a stored private key in a public key encryption system.

At a second time period $T_2$, time has elapsed and due to the need to derive a new secret value (column 1) (e.g., based on the dynamic value), the event state data (column 2) is automatically updated. As shown in the table, the device secret has the value $A_2$ and the event state data (column 2) has the value $B_2$. In one embodiment, updating the event state data (column 2) value is performed by replacing the old values with values that are derived using, for example, a one-way function. In another embodiment, the value of each bit that represents the event state data could be changed to a state that is opposite the state present at the time of the update (e.g., an inverse operation). Other variations are possible, for example other sorts of modifications and combinations with other values.

At a third time $T_3$, the device secret in column 1 and event state data in column 2 respectively are the same as they were at time $T_2$, because the elapsed time since time $T_2$ is not sufficient to complete another derivation of a new device secret. In this example, at time $T_3$, a user enters a challenge and a correct PIN in the device, and obtains an output. In other embodiments, a challenge might not be used. In this example, the output (column 4) is a function of the device secret (column 1), which incorporates the event state data (column 2) by using a key derivation function as described above. In some embodiments a challenge or a PIN may also be included in producing the output. As described above, the output may be communicated to a verifier, potentially along with the same or a different PIN or password, and a user identifier. The verifier can determine whether the output is consistent with the state it believes the device to be in. If it is not, the verifier may attempt to determine if there is a state with which it is consistent. Based on a conclusion of one of a set of acceptable states, the user can be granted some permission associated with his account, identity, or membership, or an alert triggered.

At a fourth time $T_4$, a new secret value (column 1) may be derived resulting in the event state data (column 2) being updated such that the event state data has the value B3.

At a fifth time $T_5$, a reportable event occurs. In at least one embodiment, details of the event may be stored in a temporary data store until needed. As shown in the table, the device secret and the event state data still have the value $A_3$ as a new secret value (column 1) has not yet been derived. Thus, as seen in column 4 for time $T_5$, an output value generated at time $T_5$ may not reflect that an event has occurred.

At a sixth time $T_6$, sufficient time has elapsed to derive a new secret value (column 1). Thus, the event state data (column 2) is updated and a new secret value (column 1) is derived using the updated event state data (column 2). This update to the event state data (column 2) and the derivation of a new secret value (column 1) based on the event state data (column 2) may reflect the event that occurred at time $T_5$. As described above, this change could be the result of a direct effect on the memory based on the event. As shown in the table, the device secret (column 1) and the event state data (column 2) now have the value $A_5$. Both values are different from what the values would have been had no event been registered at time $T_5$—both values would be $A_4$. This is because the values have been updated due to sufficient time elapsing and modified due to a reportable event. Replacement of the data values with a value that is known (e.g., an additional update or modification) makes it possible for the verifier to determine whether there is an event occurrence recorded at the authentication device, as this change is reflected in future authentication codes. For example, the EBITS 320 of the embodiment of FIG. 4 could be replaced. In this embodiment, any modification may cause the event state data in future time periods to remain altered.

At time $T_7$, the user again enters a challenge and a correct PIN, and obtains an output value. The identity authentication code generated by the authentication device can be derived from the device secret $A_5$ (column 1), which incorporates the event state data $B_5$ (column 2). The output value is such that the user (or an observer) may not be able to determine without knowledge of the device secret or the original event state data that the event was registered in row five, even if an observer saved all communication between the user and a device, between the device and a verifier, and between a user and a device. Thus, for example, an attacker who tampers with a token may remain unaware that event information is being transmitted to the verifier each time the altered token is used. Even so, the output value may still be such that it can be detected by the verifier (upon verification of the value and associated information) that the registered event took place during or before the time of row 7. In some embodiments, the verifier may also be able to determine that the event occurred during a time interval associated with the previous secret value.

Referring again to the embodiment of FIG. 3, as an exemplary implementation, at time $T_6$, the used EBITS 320 are replaced. Thus, $B_5$ would be different at time $T_7$ from what it had been had the event not registered at time $T_5$. The change at time $T_5$ can be included in later versions of the event state, and is reflected in the authentication code of time $T_7$.

In other implementations, it is possible that more information, such as the nature of the event and the time of the event, can be determined by the verifier. In this example, the verifier detects that the identity authentication code is a value associated with the user, but does not determine the event state. However, the value of the event state data can be modified in a manner which results in the derivation of a device secret that can be used to generate an authentication code that provides information concerning the nature and time of the event. For example, it is possible for one type of event to affect a first portion of the output, while not a second portion; whereas a second type of event can affect the second portion, but not the first. In some embodiments, the first and second portion can partially or fully overlap. If the first and second portion fully overlap, the two different events cause two different resulting output values, from which the verifier can determine not only that an event may have taken place, but also what type of event it is (i.e., the nature of the event). Similarly, the registration of an event during different time periods can affect different portions of the output, or cause the value of the output to fall within a different range of values. A multi-bit binary value can allow for the communication of more information concerning the event than a single-bit value. For example, where the event is associated with the location of the device (e.g., is the device outside the U.S.?) there may only be two possible event states—yes or no. In this example, the nature of the event can be communicated with only a single bit. However, when the event state registers that the device is located outside the U.S., the verifier may be interested in more specific information concerning the location event. In this example, the event state can communicate, for example, one of a number of possible cities, countries, or regions.

In either case, and as previously mentioned, it may only be possible for the verifier (with whom the device has been at least partially synchronized at some point in time, whether by direct communication, or by proxy) to determine from the output, or distribution of the output, whether an event was registered; what event(s) were registered; and when the event(s) were registered by the device. It should be understood that the values in the different columns only are meant to illustrate the teachings of the invention, and that they can be longer, shorter, of a different format or representation, or a combination thereof.

If the verifier determines that the determined state is one associated with the authentication device that the verifier is communicating with, while it may not be an acceptable state for granting access, it is possible for the verifier to take a specific action, for example (without limitation) to alert authorities; block access to the account; cause an event to happen, where this event can later be registered by said device; or any combination of these. As mentioned above, there can be multiple states for an event. However, in the description of FIG. 4, only two general categories (acceptable vs. not acceptable) are used for simplicity of exposition. It should be understood that a person skilled in the art can easily extend the two categories of states to three or more, given the teachings here.

Figure 5:
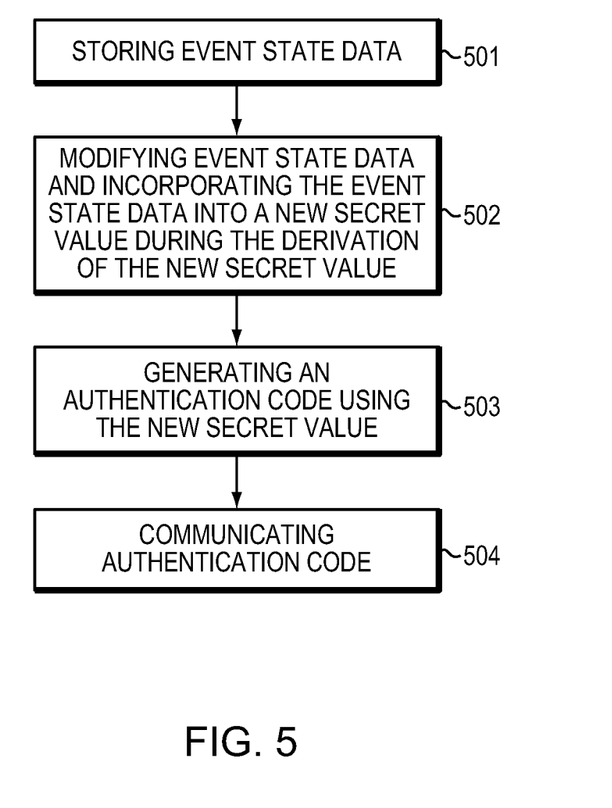
FIG. 5 is a flowchart that may be used with an embodiment of the current technique.

Referring to FIG. 5, in one embodiment, a method for generating an identity authentication code by an authentication device includes storing event state data in an authentication device (step 501). The event state data can be stored in multiple parts, for example with an event secret and separate event state bits, as in the embodiment of FIG. 3. The event state value representative of the occurrence of an event can be stored in a data store such as a conventional memory, which can be internal to or external to a processor. The event state data can be stored in a memory that is sensitive to the event, such that the event causes a memory modification without processor or other intervention. The event state data can be an electronic signal or port that is read by a processor. The event state data can be continuously updated. For example, the event state can include a memory that is continuously updated upon an appropriate change in a secret value, with a function of itself, for example as described with reference to FIG. 4. The event state data can be stored as a value associated with the event state and bits derived from the value.

The method may also include the step of modifying the event state data and incorporating the event state data into a new secret value during the derivation of the new secret value (step 502). This modification can be accomplished by a processor receiving an appropriate signal, from a switch or otherwise.

As described above, the event can take many forms, and can be an unusual, or remarkable event, or an event that is not associated with normal operation of the authentication device. In general, authentication may not be as efficient if there is not a single expected state, because the verifier may have to compute the authentication codes associated with the other event states. Non-limiting examples of unusual events include tampering with the device (e.g., trigger of a case switch), and events external to the device, such as an environmental event (e.g., temperature or radiation exposure), incorrect power input (e.g., too high or too low), or a wireless connection to an unauthorized wireless network. The event can also include the absence of such an event (e.g., power normal).

The method also includes generating an identity authentication code that depends at least in part on a dynamic value and the secret value associated with the device (step 503). The generated authentication code can also depend on user data, such as one or more of a PIN, a password, and data derived from a biometric observation. The user can provide this data to the authentication device. Some user data can be stored on the authentication device, possibly in encrypted form. The user can provide some input to the authentication device (i.e. biometric data) and the authentication device can decrypt other data.

The authentication device can verify the correctness of user data, and only provide an identity authentication code if the user data is correct. The presentation of incorrect user data a number of times can, in some embodiments, result in the modification of event state, so that the continued presentation of incorrect user data is reported to the verifier.

Authentication information including the identity authentication code can be communicated to a verifier (step 504). As mentioned, the communication to the verifier can take place with or without human intervention. The verifier receives the authentication information, which can optionally include other authentication and identification data, such as a PIN, password, biometric reading, and the like. The verifier has access to a dynamic value and a secret associated with the device that can be the same, derived from, or related to the information stored or accessed by the authentication device. The verifier can verify the identity of the user and determine the event state in response to the received authentication code.

As described above, through appropriate design, the communication of the event state can take place such that only the authentication device and the verifier are aware of the communicated state.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for use in generating authentication codes associated with devices, the method comprising:
   generating, via an authentication device, a secret value using a key derivation function wherein inputs to the key derivation function include a master secret value and event state data, the event state data specifying an operating condition of the authentication device;
   generating, via the authentication device, a first series of authentication codes that depends on the secret value and a series of dynamic values change over time;
   modifying, via the authentication device, the event state data as a result of a change to the operating condition of the authentication device;
   generating, via the authentication device, a new secret value using the key derivation function wherein inputs to the key derivation function include a master secret value and the modified event state data; and generating, via the authentication device, a second series of authentication codes that depends on the new secret value and a new series of dynamic values.

2. The method of claim 1, wherein generating the secret value further depends on a master secret value.

3. The method of claim 1, wherein changing the event state data occurs before another secret value is generated.

4. The method of claim 1, wherein the event state data is derived from an associated event secret.

5. The method of claim 1, further comprising:
changing the event state data each time the secret value changes.

6. The method of claim 1, wherein the event state data includes one or more event state bits.

7. The method of claim 1, wherein the operating condition of the device comprises environmental conditions associated with the device.

8. The method of claim 1, wherein generating one or more of the series of authentication codes occurs following a change to the operating condition of the device.

9. A system for use in generating authentication codes associated with devices, the system comprising:
first hardware logic configured to generate a secret value using a key derivation function wherein inputs to the key derivation function include a master secret value and event state data, the event state data specifying an operating condition of the authentication device;
second hardware logic configured to generate a first series of authentication codes that depends on the secret value and a series of dynamic values that change over time;
third hardware logic configured to modify the event state data as a result of a change to the operating condition of the authentication device;
fourth hardware logic configured to generate, via the authentication device, a new secret value using the key derivation function wherein inputs to the key derivation function include a master secret value and the modified event state data; and
fifth hardware logic configured to generate a second series of authentication codes that depends on the new secret value and a new series of dynamic values.

10. The system of claim 9, wherein generating the secret value further depends on a master secret value.

11. The system of claim 9, wherein changing the event state data occurs before another secret value is generated.

12. The system of claim 9, wherein the event state data is derived from an associated event secret.

13. The system of claim 9, further comprising: sixth hardware logic configured to change the event state data each time the secret value changes.

14. The system of claim 9, wherein the event state data includes one or more event state bits.

15. The system of claim 9, wherein the operating condition of the device comprises environmental conditions associated with the device.

16. The system of claim 9, wherein generating one or more of the series of authentication codes occurs following a change to the operating condition of the device.

\* \* \* \* \*